Sept. 2, 1969     A. W. BROOKS ET AL     3,464,875
METHOD OF MAKING ENDLESS V TYPE TRANSMISSION BELTS
HAVING INWARDLY DISPOSED TRANSVERSE TEETH
Filed Aug. 26, 1966     3 Sheets-Sheet 2

INVENTORS
ALDEN W. BROOKS
CLINTON L. BISHOP
JAMES R. THOMAS
KENNETH D. RICHMOND

BY

*Reuben Wolk*
ATTORNEY

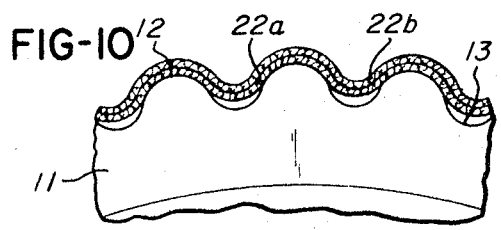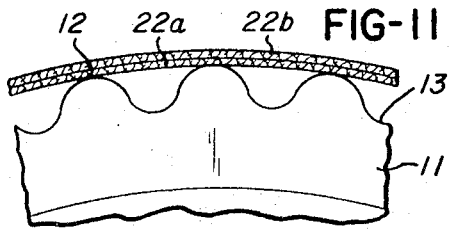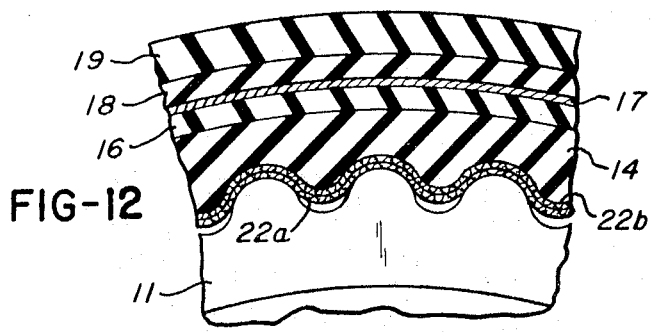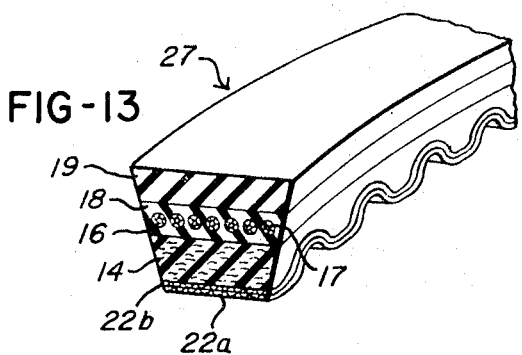

3,464,875
Patented Sept. 2, 1969

1

3,464,875
METHOD OF MAKING ENDLESS V-TYPE TRANSMISSION BELTS HAVING INWARDLY DISPOSED TRANSVERSE TEETH
Alden W. Brooks, Clinton L. Bishop, and James R. Thomas, Springfield, and Kenneth D. Richmond, Nixa, Mo., assignors to Dayco Corporation, Dayton, Ohio, a corporation of Delaware
Filed Aug. 26, 1966, Ser. No. 575,280
Int. Cl. F16g 5/04, 1/06; B29h 7/22
U.S. Cl. 156—138    6 Claims

ABSTRACT OF THE DISCLOSURE

A method of manufacturing cog or toothed type belts without using preformed cog pads. The material forming the compression section is wrapped around a corrugated mandrel and the strength cord is wound under high tension to partially force the material into the grooves and partially form the teeth.

---

This invention relates to a method of making endless V-type power transmission belts, and particularly to belts having inwardly disposed transverse teeth or cogs.

In the art of power transmission, flexible belts are operated about spaced pulleys in order to transmit the power from one pulley to the other. Where the pulleys are particularly small in diameter or where increased flexibility is important, these belts employing teeth or cogs are often preferred to conventional V-type belts. Since the grooves between the teeth offer no resistance to the movement of the cogs as they flex about the pulleys, these belts combine greater flexibility with reduced internal stresses and resultant longer belt life. It is, therefore, highly important to manufacture such belts which provide a high degree of flexibility while still maintaining the necessary wear and life characteristics.

Belts of this general type have been known for many years as evidenced by United States Patents No. 1,611,-829 and No. 1,928,869 in which various methods of manufacturing this type of belt have been illustrated. The most frequently used process is one in which the cogs or teeth are preformed in some manner and are placed about a drum as best illustrated in the above-referenced Patent No. 1,928,869, and then the remaining portion of the belt sleeve is wrapped around these teeth to form a completed sleeve.

The present invention seeks to provide an improvement over this method by eliminating the preforming step and merely wrapping the various components of the belt sleeve around the building drum and utilizing a portion of the sleeve itself to act as an inward compressive force which creates the transverse teeth and grooves that are characteristic of this type of belt. More specifically, this is accomplished by successively building upon the drum the compression section, a portion of the neutral axis section, and then wrapping a strength cord under high tension around this neutral axis section in order to create the necessary inward force to cause the compression section material to flow into the preformed grooves of the drum and create this desired tooth section. Subsequently,

2 the outer portion of the neutral axis and the tension section are placed over the cord to complete the belt sleeve. While the broad concept of utilizing a strength cord for this purpose has been suggested in United States Patent No. 1,510,449, there are additional differences in the method which will be brought out more fully in the following disclosure.

The improved process and product also contemplates the use of a compression section having a high degree of wear resistance and strength by virtue of incorporating transversely aligned fibers within the body of the material. Other modifications of the invention which provide improved flexibility include the use of certain types of fabrics at the inner portion of the compression section.

It is, therefore, a principal object of the present invention to manufacture a belt having improved wear characteristics.

It is a further object of the invention to make such a belt which is more flexible than conventional belts of this type.

These and other objects will be more clearly illustrated in the following description and drawings, in which:

FIGURES 10–12 are end elevational views in partial cross section illustrating further steps in the manufacture of a modified form of the invention.

FIGURE 13 is a perspective view in partial cross section illustrating the final form of the modified belt.

Figure 1:
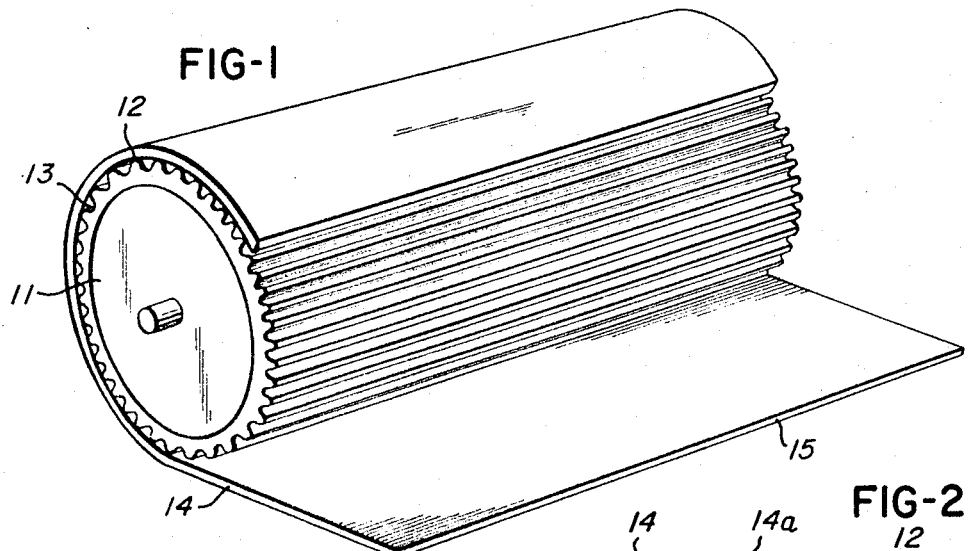
FIGURE 1 is a perspective view in partial cross section illustrating a first step in the manufacture of the novel belt.

Referring now to FIGURE 1, the belt is built on a conventional mandrel or drum 11 which is a cylindrical member, preferably formed of steel or similar material and having an outer corrugated surface with outwardly extending ridges 12 alternating with grooves 13. This mandrel may either be formed of a single machined member having the shape illustrated, or may be a cylindrical drum upon which is placed an outer portion having the flutes and grooves which are shown. The exact method of making such drums is well known in the prior art and is not the subject of this invention.

Figure 2:
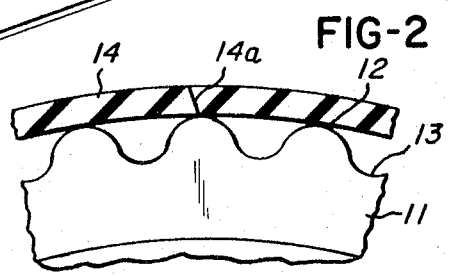
FIGURES 2–6 are end elevational views in partial cross section illustrating the sequence of steps in the construction of the principal form of the invention.

As a first step in the manufacture of one form of the invention, a sheet of rubber material 14 is wrapped around the drum as shown in FIGURE 1 until it completely envelops the outer surface of the drum with the ends forming a bevel splice such as designated by reference numeral 14a in FIGURE 2. This sheet of rubber is laid upon the surface of the drum so that the inner portion of the sheet contacts the outer surface of the flutes 12 but does not tend to dip within the grooves 13 to any appreciable extent. The sheet 14 may be made of a soft uncured synthetic or natural rubber material such as is well known in the art of manufacturing belts, but in addition, contains a number of discrete fibers 15 which are oriented longitudinally of the drum (transversely at the width of the sheet of rubber). These fibers may be made of any suitable material such as cotton, rayon, nylon, or polyester.

Figure 3:
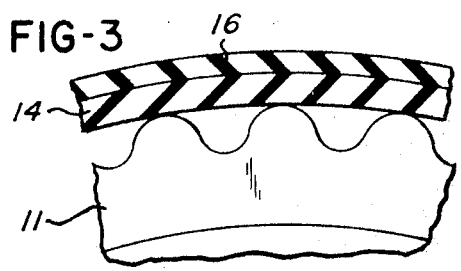

As a next step of the invention, another sheet of rubber 16 which comprises the inner portion of the neutral axis section is wrapped around the sheet 14 as shown in FIGURE 3. This sheet 16 is also made of material similar to 14 except it is compounded to be more suitable for its function.

Figure 4:
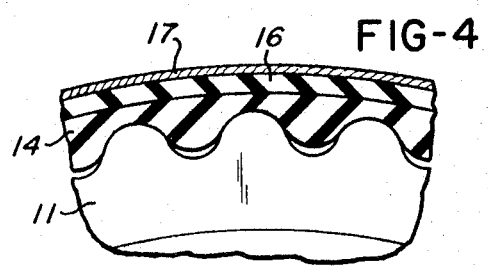

The next step of the invention, illustrated in FIGURE 4, is the placing of the strength cord 17 about the sheet 16; this is accomplished by methods well known in the art of belt manufacture such as illustrated in United States Patent No. 3,188,254 whereby the cord is spun around the periphery of the assembly in a helical fashion. This cord is applied under high tension, approximately five times as great as the tension normally applied to belt cords when used in manufacturing belts. This cord 17 may be made of such materials as nylon, rayon, polyester, or glass fibers, and the axially inward tension applied by spinning this cord caused the material of the sheet 14 to flow into the grooves 13. As shown in FIGURE 4, this material will not completely fill the grooves but will leave a certain amount of space. The material which has flowed will cause a very slight thinning of the entire thickness of this sheet 14 and may even cause a very slight indentation. It is this step which provides the principal point of departure from the prior art since it eliminates the need for placing separate teeth within the grooves.

Figure 5:
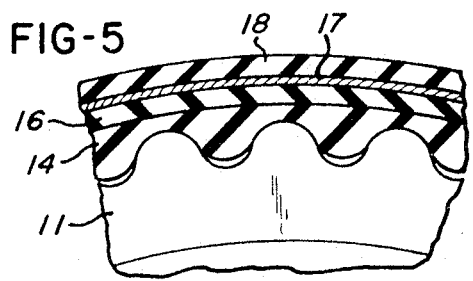
Figure 6:
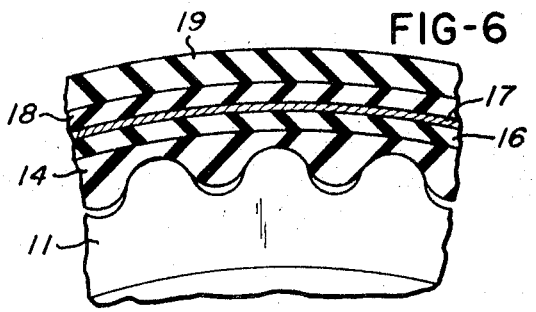

After completion of the winding step, an additional layer 18 of neutral axis material in sheet form is placed over the cord as shown in FIGURE 5. This is followed by the step illustrated in FIGURE 6 in which the outer tension section 19 is then wrapped around the entire assembly. The material which forms this sheet 19 is somewhat different than the others in that the tension section has different characteristics than the other sections.

Figure 7:
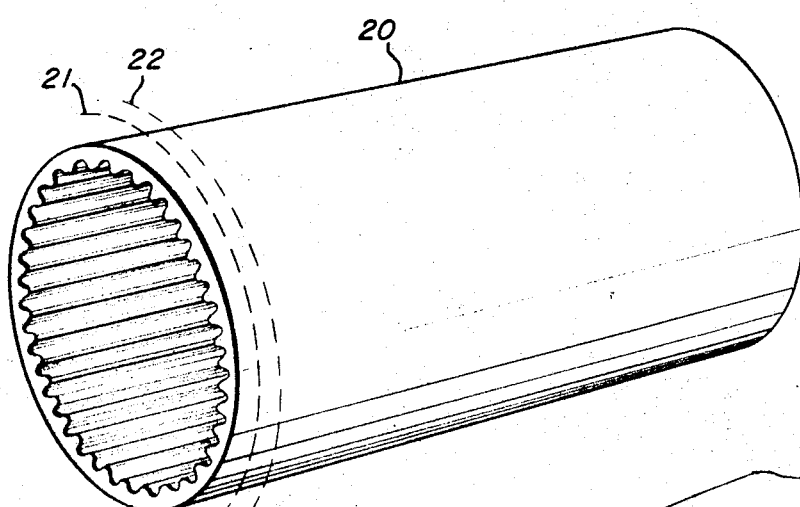
FIGURE 7 is a perspective view of the completed belt sleeve.
Figure 8:
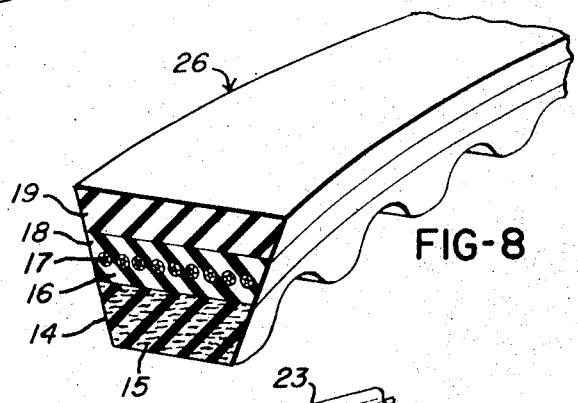
FIGURE 8 is a perspective view in partial cross ection illustrating the finished form of the novel belt.

The final assembled belt sleeve 20 is illustrated in FIGURE 7 and this sleeve is then subjected to a conventional vulcanizing process which is well known in the art. For example, the sleeve may be placed in a differential mold and subjected to steam which provides the necessary pressure and temperature to create the vulcanizing process. During this process there will be an additional flow of rubber material throughout the entire assembly to provided an integral belt sleeve, and the material of the compression section 16 will complete its flow to assume the teeth and groove shape of the drum. The sleeve may then be removed from the curing mold and cut into individual belts such as illustrated in FIGURE 8. The cutting procedure is conventional in the prior art and is performed along longitudinal lines such as 21 and 22.

The completed belt 26 now comprises the inner compression section 14 having transverse fibers 15, the neutral axis section 16–18 which incorporates the strength cords 17, and the outer tension section 19.

Figure 9:
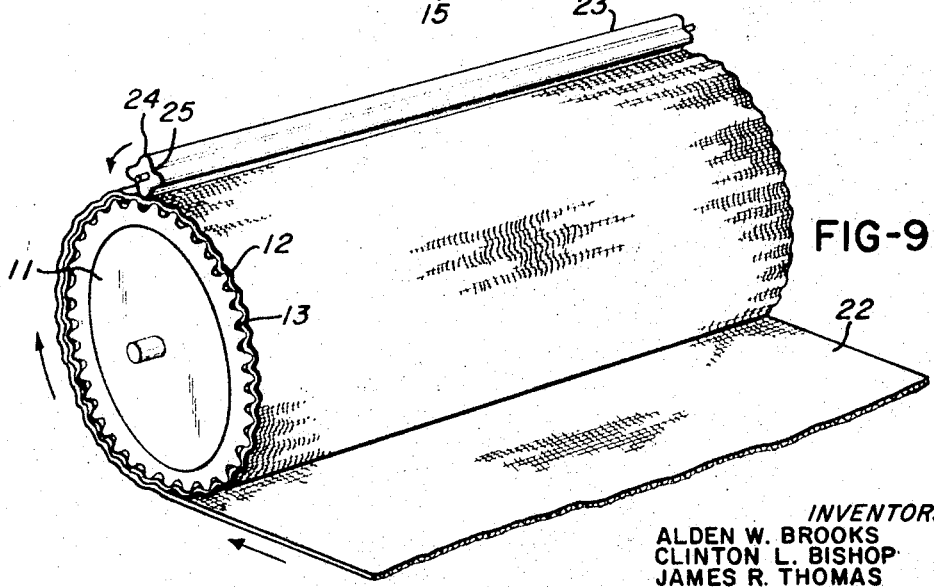
FIGURE 9 is a view similar to FIGURE 1 illustrating a modified form of the invention.

A modified form of the invention is illustrated in FIGURE 9 in which the first step in the fabrication of the belt involves the application of one or more layers of a fabric 22. This fabric is fed from a continuous roll and wrapped around the drum 11 which is rotated in the direction shown; at the same time a "stitching" roll 23, which is mounted adjacent the mandrel, is rotated oppositely and forces the fabric partially into the grooves as shown in FIGURE 10. The stitching roll 23 has a plurality of flutes 24 which mesh with the grooves 13 of the drum, interspersed by grooves 25 which mesh with the flutes 12 of the drum. For purposes of illustration, the fabric 22 is illustrated in FIGURE 10 as having two layers 22a and 22b, although it is normally expected that anywhere between one and six layers of fabric may be used. The fabric 22 is preferably a medium or high stretch bias-woven fabric which tends to be easily forced into the grooves by the stitching roll. One type of such fabric which has found particular utility is one in which the stresses of the fabric have been previously relieved and which is commonly referred to as a "stress-relieved fabric." In this type of fabric the warp and weft threads are disposed at an angle with each other that is not 90 degrees as in conventional fabric, but rather at an obtuse angle with each other, so that the angle between the warp and weft threads is between 95 and 155 degrees, with respect to the longitudinal axis of the finished belt.

As a further variation of this step it is also possible to merely wrap the fabric 22 around the drum 11 without the use of the stitching roll, in a manner illustrated in FIGURE 11. In this case the fabric merely lays across the flutes 12 of the drum without dipping into the grooves, much in the manner of the inner section 14 of FIGURE 2. When this process is utilized, a different type of fabric is required than for the FIGURE 10 configuration; the fabric may be a high-stretch bias-woven fabric, or a similar fabric with longitudinal stretch, and either of these may be provided in plain form or with a thin coating of rubber on the surface. In either instance the fabric material provides an additional improvement in the belt which will be described below.

Whichever of the above fabrics is utilized, and whether or not the stitching roll is applied, the fabric layers will then be surmounted by a sheet of rubber 14 which provides the same compression section as in the principal modification of the invention described above. This will then be followed by the inner neutral axis portion 16, the cord 17, the outer neutral axis section 18, and the tension section 19 exactly as in the principal modification. This provides the relationship illustrated in FIGURE 12 which is similar to that illustrated in FIGURE 6, except for the addition of the fabric layers 22a and 22b. Once again the tension of the cord 17 has caused the material of section 14 to partially flow into the grooves of the mandrel. The completed assembly is cured as described above and then cut into separate belts 27 such as illustrated in FIGURE 13. This finished product is similar to the belt 26 except for the addition of layers 22a and 22b of fabric which comprise the inner portion of the belt as shown in FIGURE 13. This construction provides for the first time a toothed or cogged belt having multiple fabric layers on its inner surface which have been found to improve the wear and life characteristics of the belt. It should be noted that these fabric layers follow the general configuration of the teeth and grooves in a manner not hitherto possible.

What is claimed is:

1. A method of manufacturing endless V-type transmission belts having an inner surface in the form of alternating transverse teeth and grooves, comprising the steps of placing an inner layer of rubber around a cylindrical forming member having corrugations in its outer surface, helically applying a continuous strength cord under high tension around said layer at approximately right angles to said corrugations to partially form teeth in said layer of rubber, applying an outer layer of rubber around said cord, vulcanizing the assembly to complete the formation of said teeth, and cutting the vulcanized assembly into a plurality of finished belts.

2. The method of claim 1 including the steps of applying intermediate layers of rubber inwardly and outwardly of said cord.

3. A method of manufacturing endless V-type transmission belts having an inner surface in the form of alternating teeth and grooves, comprising the steps of placing at least one layer of fabric around a cylindrical forming member having corrugations in its outer surface, placing an inner layer of rubber around said fabric, helically applying a continuous strength cord under high tension around said layer of rubber at approximately right angles to said corrugations to partially form teeth in said fabric and rubber, applying an outer layer of rubber around said cord, vulcanizing the assembly to complete the formation of said teeth, and cutting the vulcanized assembly into a plurality of finished belts.

4. The method of claim 3 in which said fabric is partially formed into teeth before said inner layer of rubber is applied.

5. The method of claim 3 in which said fabric has a high degree of stretchability.

6. The method of claim 3 in which said fabric has warp and weft threads which are disposed at angle of 95 to 155 degrees with each other.

References Cited

UNITED STATES PATENTS

| | | | |
|---|---|---|---|
| 2,268,865 | 1/1942 | Freedlander | 156—138 |
| 1,510,449 | 9/1924 | Brucker | 156—138 |
| 3,250,653 | 5/1966 | Geist et al. | 156—138 |

HAROLD ANSHER, Primary Examiner

PHILIP DIER, Assistant Examiner

U.S. Cl. X.R.

156—140, 162, 189, 196, 242, 250; 161—144; 74—233